United States Patent
Ide et al.

(10) Patent No.: US 11,573,548 B2
(45) Date of Patent: Feb. 7, 2023

(54) INFORMATION PROCESSING APPARATUS, CONTROL METHOD, AND STORAGE MEDIUM

(71) Applicant: HONDA MOTOR CO., LTD., Tokyo (JP)

(72) Inventors: Takayuki Ide, Wako (JP); Koichi Yahagi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/197,753

(22) Filed: Mar. 10, 2021

(65) Prior Publication Data
US 2021/0294290 A1 Sep. 23, 2021

(30) Foreign Application Priority Data
Mar. 19, 2020 (JP) .............................. JP2020-049462

(51) Int. Cl.
*H04L 51/02* (2022.01)
*G05B 19/042* (2006.01)

(52) U.S. Cl.
CPC .......... *G05B 19/0423* (2013.01); *H04L 51/02* (2013.01)

(58) Field of Classification Search
CPC ............................ G05B 19/0423; H04L 51/02
USPC ............................................................ 700/9
See application file for complete search history.

(56) References Cited

U.S. PATENT DOCUMENTS

| 2011/0213642 A1* | 9/2011 | Makar ................. G06F 16/9535 705/14.51 |
| 2019/0166071 A1* | 5/2019 | Lim ......................... G06Q 10/10 |
| 2019/0182382 A1* | 6/2019 | Mazza .................... H04L 51/02 |

(Continued)

FOREIGN PATENT DOCUMENTS

| JP | 2002-269327 A | 9/2002 |
| JP | 2019-23833 A | 2/2019 |

OTHER PUBLICATIONS

Hamamoto, Masaki et al., "Study on Personal-Assistance Robotic Process Automation for Improving Efficiency of White-Collar Non-Core Operations", Interactive Information Access Visual Mining, Proceedings of 17th Meeting for Presentation of Research Papers of Study Group [online], Japan, The Japanese Society for Artificial Intelligence, Nov. 27, 2017, pp. 7-12, with English Abstract; Cited in JP Office Action dated Dec. 6, 2021. (7 pages).

(Continued)

*Primary Examiner* — Imad Hussain
(74) *Attorney, Agent, or Firm* — WHDA, LLP

(57) ABSTRACT

An obtainment unit obtains a first input value set corresponding to a first input item set that includes at least a part of a plurality of input items. A selection unit selects at least one RPA robot from among a plurality of RPA robots that are each associated with a respective input item set based on at least a part of the first input value set. Each of the plurality of RPA robots is configured to obtain a respective input value set corresponding to the respective input item set. A launching unit launches the at least one RPA robot. A control unit performs control so that each of the at least one RPA robot obtains, as the respective input value set, an input value set corresponding to the respective input item set among the first input value set.

5 Claims, 10 Drawing Sheets

(56) References Cited

U.S. PATENT DOCUMENTS

2021/0119944 A1* 4/2021 Kim ..................... G06F 40/35
2021/0144107 A1* 5/2021 Liang .................... G06N 5/04

OTHER PUBLICATIONS

"Selection Points for Tool Enhancement", Nikkei Computer, Japan, Nikkei BP, Nov. 23, 2017, No. 952, pp. 30-33, with Partial English Translation; Cited in JP Office Action dated Dec. 6, 2021. (16 pages).

Office Action dated Dec. 6, 2021, issued in counterpart to JP Application No. 2020-049462, with Partial English translation. (4 pages).

Final Rejection dated Mar. 22, 2022, issued in counterpart JP Application No. 2020-049462, with partial English Translation. (3 pages).

\* cited by examiner

FIG. 4A

IF APPLICATION CATEGORY (ITEM ID 1) IS DOMESTIC BUSINESS TRIP APPLICATION

| ID | ITEM NAME | INPUT RULES |
|---|---|---|
| 1 | APPLICATION CATEGORY | SELECT FROM NEXT OPTIONS<br>1. DOMESTIC BUSINESS TRIP APPLICATION<br>2. DOMESTIC BUSINESS TRIP REIMBURSEMENT<br>3. INTERNATIONAL BUSINESS TRIP APPLICATION<br>4. INTERNATIONAL BUSINESS TRIP REIMBURSEMENT |
| 2 | BUSINESS TRIP PERIOD | FREE INPUT<br>(EXAMPLE: 20200203-20200205) |
| 3 | PLACES VISITED | FREE INPUT<br>(EXAMPLE: X COMPANY) |
| 4 | DEPARTURE AND RETURN CATEGORY | SELECT FROM NEXT OPTIONS<br>1. DEPART FROM COMPANY - RETURN TO COMPANY<br>2. GO DIRECTLY - RETURN TO COMPANY<br>3. DEPART FROM COMPANY - RETURN DIRECTLY<br>4. GO DIRECTLY - RETURN DIRECTLY |
| 5 | DEPARTURE TIME | FREE INPUT<br>(EXAMPLE: 0930) |
| 6 | RETURN TIME | FREE INPUT<br>(EXAMPLE: 1530) |
| 7 | MEANS OF TRANSPORTATION | SELECT FROM NEXT OPTIONS<br>1. PUBLIC TRANSPORTATION SYSTEM<br>2. COMPANY CAR |

FIG. 4B

IF APPLICATION CATEGORY (ITEM ID 1) IS
DOMESTIC BUSINESS TRIP REIMBURSEMENT

| ID | ITEM NAME | INPUT RULES |
|---|---|---|
| 1 | APPLICATION CATEGORY | SELECT FROM NEXT OPTIONS<br>1. DOMESTIC BUSINESS TRIP APPLICATION<br>2. <u>DOMESTIC BUSINESS TRIP REIMBURSEMENT</u><br>3. INTERNATIONAL BUSINESS TRIP APPLICATION<br>4. INTERNATIONAL BUSINESS TRIP REIMBURSEMENT |
| 2 | BUSINESS TRIP PERIOD | FREE INPUT<br>(EXAMPLE: 20200203-20200205) |
| 3 | PLACES VISITED | FREE INPUT<br>(EXAMPLE: X COMPANY) |
| 4 | DEPARTURE AND RETURN CATEGORY | SELECT FROM NEXT OPTIONS<br>1. DEPART FROM COMPANY - RETURN TO COMPANY<br>2. GO DIRECTLY - RETURN TO COMPANY<br>3. DEPART FROM COMPANY - RETURN DIRECTLY<br>4. GO DIRECTLY - RETURN DIRECTLY |
| 8 | UNSTAMPED TIME? | SELECT FROM NEXT OPTIONS<br>1.YES<br>2.NO |
| 9* | UNSTAMPED DATE | FREE INPUT<br>(EXAMPLE: 20200203) |
| 10* | WORKING HOURS | FREE INPUT<br>(EXAMPLE: 0900-1800) |
| 11 | ACCOMMODATION EXPENSES | FREE INPUT<br>(EXAMPLE: Y HOTEL 2 NIGHTS, ZZZ YEN) |

*MULTIPLE SETS MAY BE INPUTTED FOR ITEM ID 9 AND 10

FIG. 5

| ID | ITEM NAME | INPUT VALUE |
|---|---|---|
| 1 | APPLICATION CATEGORY | 1. DOMESTIC BUSINESS TRIP APPLICATION |
| 2 | BUSINESS TRIP PERIOD | 20200217 |
| 3 | PLACES VISITED | X COMPANY |
| 4 | DEPARTURE AND RETURN CATEGORY | 1. DEPART FROM COMPANY - RETURN TO COMPANY |
| 5 | DEPARTURE TIME | 0930 |
| 6 | RETURN TIME | 1530 |
| 7 | MEANS OF TRANSPORTATION | 1. PUBLIC TRANSPORTATION SYSTEM |

FIG. 7

| APPLICATION CATEGORY ITEM ID 1 | UNSTAMPED TIME? ITEM ID 8 | ROBOT ID | LAUNCH SYSTEM |
|---|---|---|---|
| 1. DOMESTIC BUSINESS TRIP APPLICATION | NO CORRESPONDING ITEM | 1&2 | ATTENDANCE & ACCOUNTING |
| 2. DOMESTIC BUSINESS TRIP REIMBURSEMENT | 1. YES | 3&4 | ATTENDANCE & ACCOUNTING |
| SAME AS ABOVE | 2. NO | 4 | ACCOUNTING |
| 3. INTERNATIONAL BUSINESS TRIP APPLICATION | NO CORRESPONDING ITEM | 5 | ACCOUNTING |
| 4. INTERNATIONAL BUSINESS TRIP REIMBURSEMENT | NO CORRESPONDING ITEM | 6 | ACCOUNTING |

ROBOT ID 1: ATTENDANCE INPUT ROBOT FOR DOMESTIC BUSINESS TRIP APPLICATION
ROBOT ID 2: ACCOUNTING INPUT ROBOT FOR DOMESTIC BUSINESS TRIP APPLICATION
ROBOT ID 3: ATTENDANCE INPUT ROBOT FOR DOMESTIC BUSINESS TRIP REIMBURSEMENT
ROBOT ID 4: ACCOUNTING INPUT ROBOT FOR DOMESTIC BUSINESS TRIP REIMBURSEMENT
ROBOT ID 5: ACCOUNTING INPUT ROBOT FOR INTERNATIONAL BUSINESS TRIP APPLICATION
ROBOT ID 6: ACCOUNTING INPUT ROBOT FOR INTERNATIONAL BUSINESS TRIP REIMBURSEMENT

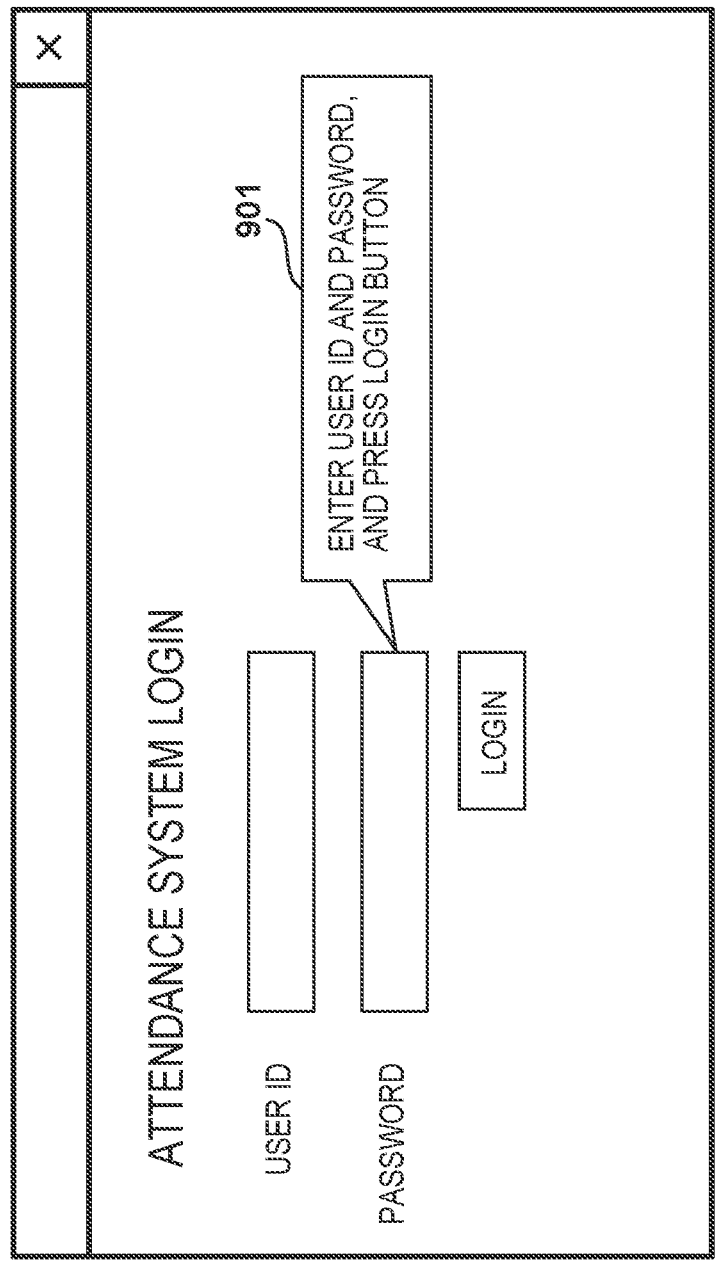

INFORMATION PROCESSING APPARATUS, CONTROL METHOD, AND STORAGE MEDIUM

CROSS-REFERENCE TO RELATED APPLICATION(S)

This application claims priority to and the benefit of Japanese Patent Application No. 2020-049462 filed on Mar. 19, 2020, the entire disclosure of which is incorporated herein by reference.

BACKGROUND OF THE INVENTION

Field of the Invention

The present invention relates to an information processing apparatus, a control method, and a storage medium.

Description of the Related Art

Nowadays, in various scenes (e.g., when getting a reimbursement for travel expenses during business trips), users of such information processing apparatuses as personal computers (PCs) are requested to perform input with respect to various input items (e.g., the places visited, accommodation expenses, and so forth) requested by an input system (e.g., an accounting system). Japanese Patent Laid-Open No. 2019-023833 discloses a technique to support such input.

Also, in recent years, a technique called RPA (Robotic Process Automation) has become widespread. RPA is a technique whereby various tasks that have been conventionally performed by humans are automated by a robot that is implemented using software (program). For example, an input operation for the aforementioned input system can be executed by an RPA robot.

Input items requested by an input system are not necessarily the same. For example, there is a possibility that input items requested by an accounting system vary between the case of domestic business trips and the case of international business trips. When one RPA robot is configured to be capable of covering a large number of patterns related to input items, software (program) becomes bloated, and a processing load on the RPA robot increases.

SUMMARY OF THE INVENTION

The present invention has been made in view of the aforementioned situation, and provides a technique to reduce a processing load on an input operation performed by an RPA robot for an input system.

According to an aspect of the present invention, there is provided an information processing apparatus, comprising: an obtainment unit configured to obtain a first input value set corresponding to a first input item set that includes at least a part of a plurality of input items; a selection unit configured to select at least one RPA robot from among a plurality of RPA robots that are each associated with a respective input item set based on at least a part of the first input value set, each of the plurality of RPA robots being configured to obtain a respective input value set corresponding to the respective input item set, and perform an input operation related to the respective input item set based on the respective input value set on an input screen of an input system; a launching unit configured to launch the at least one RPA robot; and a control unit configured to perform control so that each of the at least one RPA robot obtains, as the respective input value set, an input value set corresponding to the respective input item set among the first input value set.

BRIEF DESCRIPTION OF THE DRAWINGS

FIGS. 4A and 4B are diagrams showing examples of input items.

FIG. 5 is a diagram showing an example of display of input values obtained through the chat processing.

FIG. 7 is a diagram showing examples of criteria for selecting an input robot.

FIG. 9 is a diagram showing an example of a login screen.

DESCRIPTION OF THE EMBODIMENTS

Figure 1:
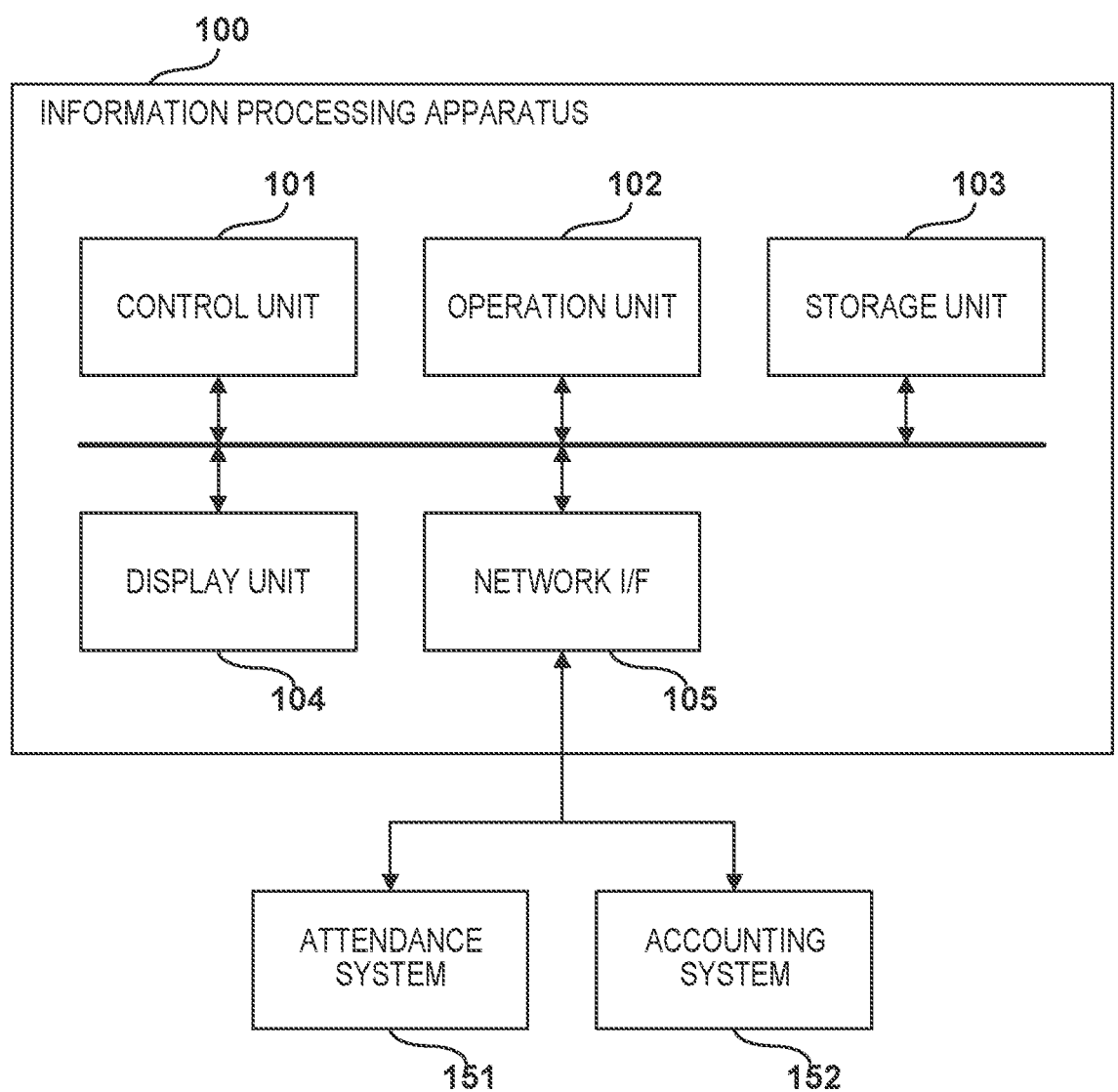
FIG. 1 is a functional block diagram of an information processing apparatus 100.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a functional block diagram of an information processing apparatus 100. The information processing apparatus 100 is an electronic device, such as a personal computer (PC), a smartphone, and a tablet. In the following description, it is assumed that the information processing apparatus 100 is a PC that is equipped with Windows® as an operating system (OS).

In FIG. 1, a control unit 101 includes, for example, a CPU, a ROM, a RAM, and the like, and controls the entirety of the information processing apparatus 100 by executing various types of programs including the OS. An operation unit 102 includes, for example, such input devices as a keyboard and a mouse, and accepts an input operation performed by a user. A storage unit 103 includes, for example, a recording medium, such as an HDD and an SDD, and stores various types of programs including the OS. A display unit 104 includes, for example, a liquid crystal display, and displays user interfaces, various types of information, and so forth. A network I/F 105 is an interface that is intended to allow the information processing apparatus 100 to communicate with an external apparatus.

The information processing apparatus 100 can communicate with input systems via the network I/F 105, and input values for predetermined input items on the input screens provided by the input systems. Although it is assumed in the following description that an attendance system 151 and an accounting system 152 are used as examples of the input systems, no particular limitation is intended regarding the number and the types of the input systems. Also, each input system may be system that requests a login. Furthermore, each input system may be configured to enable a login with use of the shared user ID and password (user identification information and authentication-purpose knowledge information).

The attendance system 151 is a system that accepts an application related to attendance pertaining to a user's business trip (e.g., input values for input items related to attendance, such as working hours). The accounting system 152 is a system that accepts an application related to accounting pertaining to a user's business trip (e.g., input values for input items related to accounting, such as accommodation expenses).

The input systems can be implemented by an arbitrary number of computers. Although the attendance system 151 is illustrated as one block in the example of FIG. 1, the attendance system 151 can be implemented by a plurality of computers that can communicate with one another. Similarly, the accounting system 152 can be implemented by a plurality of computers that can communicate with one another. Also, at least one computer may be involved with the implementation of both of the attendance system 151 and the accounting system 152.

The information processing apparatus 100 can actuate a chatbot. The chatbot is a program that has a function of interacting with a user in accordance with programs, and is stored in the storage unit 103. The information processing apparatus 100 can display a chat screen on the display unit 104 by launching the chatbot in response to a user instruction issued via, for example, the operation unit 102, and execute processing for interacting with the user (chat processing). The information processing apparatus 100 can obtain at least one input value (input value set) to be input to at least one of the attendance system 151 and the accounting system 152 via interaction with the user.

Furthermore, the information processing apparatus 100 can actuate an RPA robot (input robot) that automates at least a part of an input operation for the input systems. Programs, data, and the like for implementing the RPA robot are stored in, for example, the storage unit 103. The details of the RPA robot will be described later.

Figure 2:
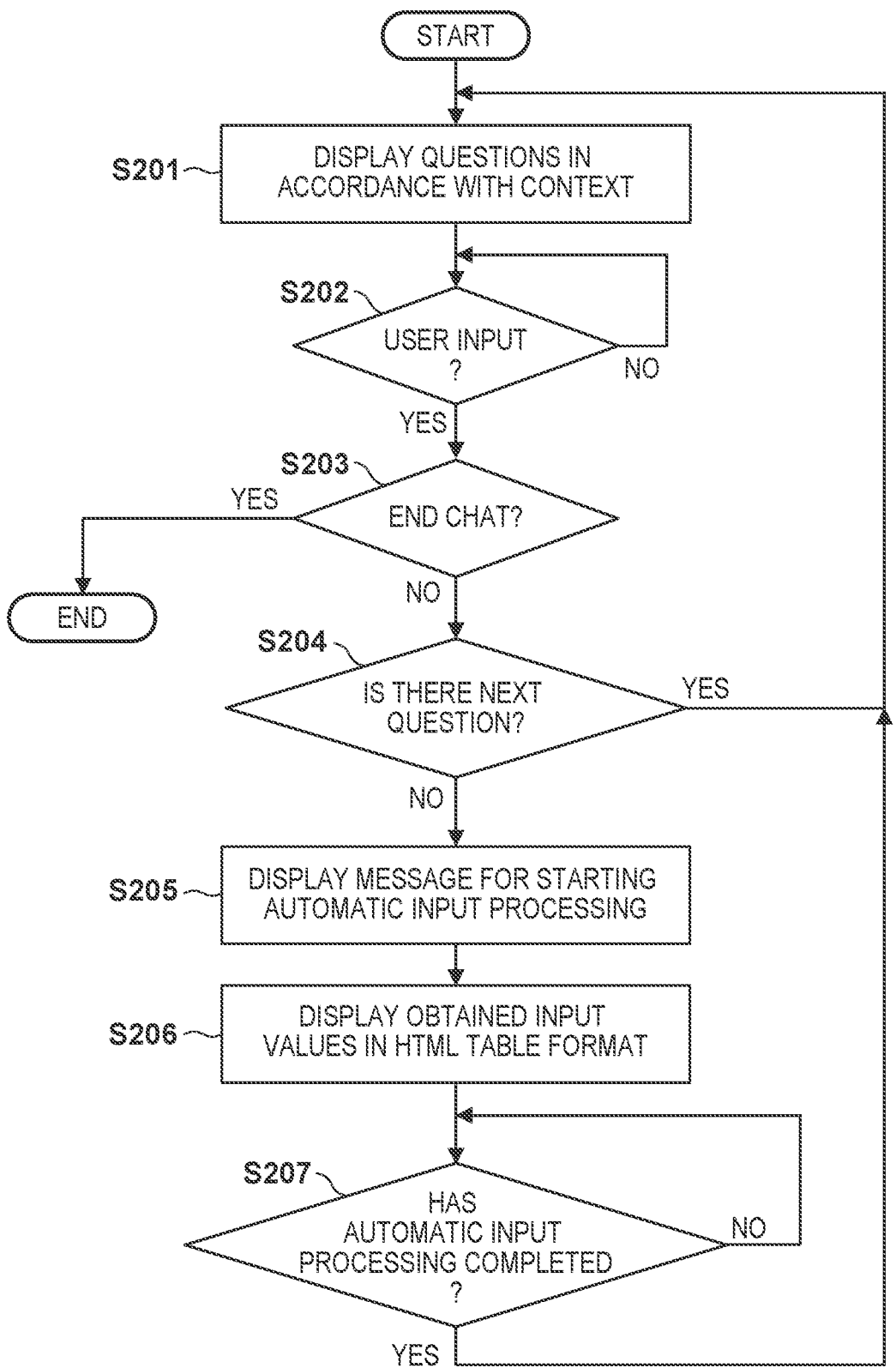
FIG. 2 is a flowchart of chat processing executed by the information processing apparatus 100.

FIG. 2 is a flowchart of the chat processing executed by the information processing apparatus 100. In step S201, the control unit 101 displays a question on the chat screen in accordance with context (questions and responses thereto up to this point).

Figure 3:
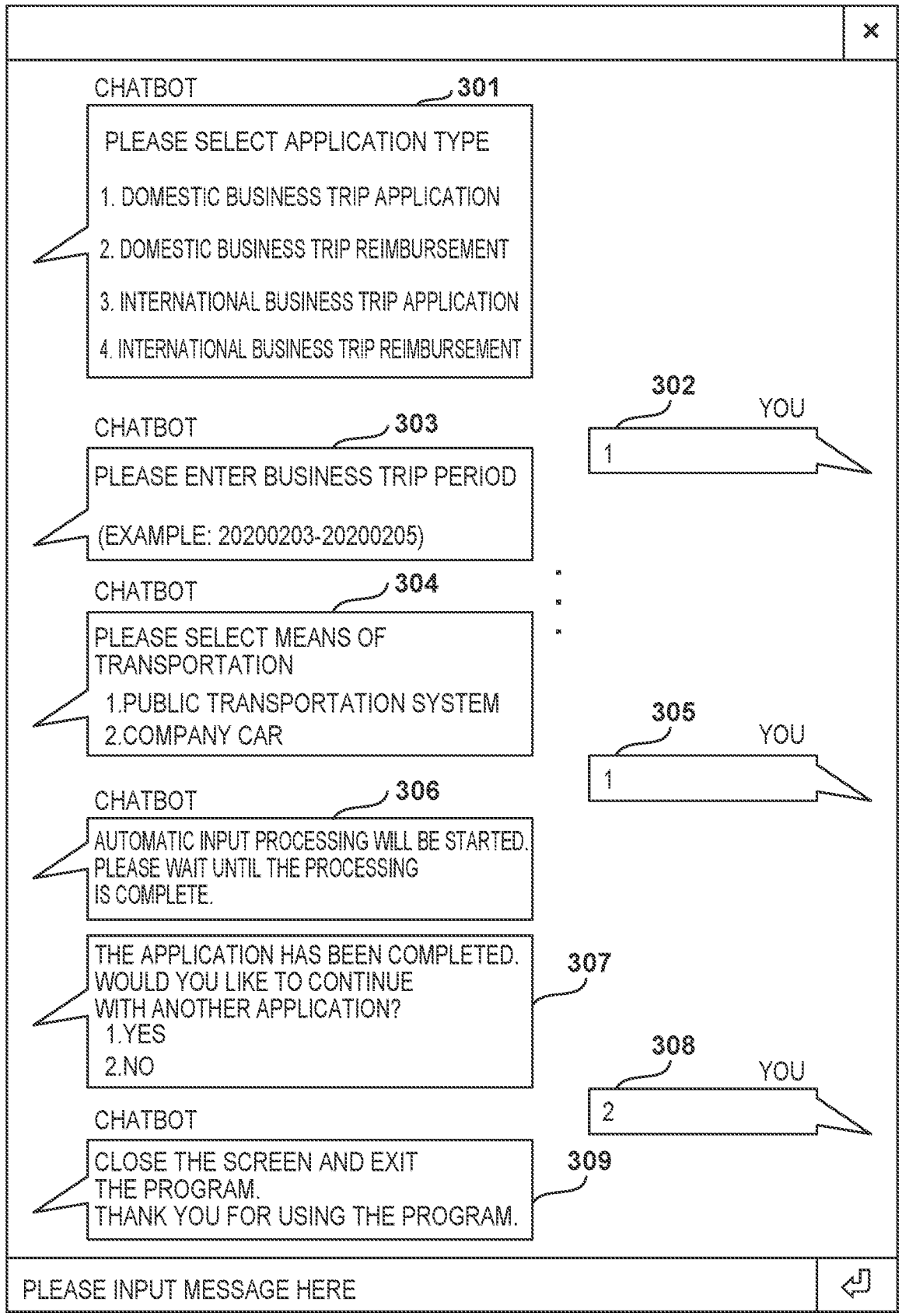
FIG. 3 is a diagram showing an example of a chat screen.

FIG. 3 is a diagram showing an example of the chat screen. For example, a question that is displayed first after the start of the chat processing is a message 301 shown in FIG. 3, which prompts a user to input an application type (application category).

In step S202, the control unit 101 waits until user input is performed via the operation unit 102. User input is inputting of a response to the question that was displayed in step S201, such as a message 302 of FIG. 3, for example. Alternatively, user input may be inputting of a message representing an instruction for ending the chat, such as "quit". Once user input has been performed, processing proceeds to step S203.

In step S203, the control unit 101 determines whether user input performed in step S202 is inputting of a message representing an instruction for ending the chat. When user input is inputting of the message representing the instruction for ending the chat, the chat processing of the present flowchart is ended; otherwise, processing proceeds to step S204. Note that when the chat processing is ended, the control unit 101 may display a message 309.

In step S204, the control unit 101 determines whether there is a next question based on context (questions and responses thereto up to this point). Where there is a next question, processing returns to step S201; when there is no next question, processing proceeds to step S205.

As a result of repeating the display of a question in accordance with context in step S201 and user input in step S202 (inputting of a response to the question), various messages including, for example, messages 301 to 305 are displayed on the chat screen. Furthermore, each question is associated with an input item for at least one of the attendance system 151 and the accounting system 152. The control unit 101 obtains an answer to each question as an input value corresponding to the input item associated with the question.

FIGS. 4A and 4B are diagrams showing examples of input items. An ID (item ID) and a name (item name) are allocated to each input item. Also, each input item has an input rule, and the control unit 101 displays a message that prompts input compliant with the input rule in the chat processing.

Furthermore, FIGS. 4A and 4B also show examples of the selection of questions in accordance with context in the chat processing (i.e., the selection of input items for which input values are to be obtained). Specifically, a table of FIG. 4A shows examples of input items that are selected when a response to an input item "application category" is "1" (domestic business trip application). That is to say, the message 301 of FIG. 3 corresponds to item ID 1, and when the message 302 has been input as a response to the message 301, questions for requesting input values corresponding to input items with item IDs 2 to 7 are made in the repetition of processing of step S201 thereafter.

A table of FIG. 4B shows examples of input items that are selected when a response to the input item "application category" is "2" (domestic business trip reimbursement). That is to say, the message 301 of FIG. 3 corresponds to item ID 1, and when "2" has been input as a response to the message 301, questions for requesting input values corresponding to input items with item IDs 2 to 4, 8, and 11 are made in the repetition of processing of step S201 thereafter. In addition, when a response to the input item "application category" is "2" (domestic business trip reimbursement), subsequent questions vary depending on a response to item ID 8 (whether there is unstamped time). That is to say, when a response to item ID 8 (whether there is unstamped time) is "1" (there is unstamped time), questions for requesting input values corresponding to item IDs 9 and 10 are also made. Note that "unstamped time" denotes time related to working hours that was not stamped on a timesheet. For example, there is "unstamped time" when the user was not able to stamp the end time of work because he/she went straight home from the destination of a business trip.

Note that the selection of questions in correspondence with context in the chat processing of the present embodiment (i.e., the selection of input items for which input values are to be obtained) is not limited to the examples of FIGS. 4A and 4B, and a selection method that suits the intended use of the input systems can be adopted as appropriate. Also, although exemplary illustrations of input items are omitted with respect to a case where a response to the input item "application category" is "3" (international business trip application) or "4" (international business trip reimbursement), a selection method that suits the intended use of the input systems can be adopted as appropriate in this case as well.

Referring back to FIG. 2, in step S205, the control unit 101 displays a message for starting automatic input processing, such as a message 306 shown in FIG. 3, for example. The details of the automatic input processing will be described later with reference to FIG. 6 to FIG. 9.

In step S206, the control unit 101 displays the input values that were obtained through the repetition of processing of steps S201 and S202 on the display unit 104 in a predetermined format (e.g., an HTML table format shown in FIG. 5).

In step S207, the control unit 101 waits until the automatic input processing is completed. Once the automatic input processing has been completed, processing returns to step S201. In this case, the control unit 101 displays, for example, a message 307 shown in FIG. 3 in step S201. The user can end the chat by inputting a message 308 as a response to the message 307.

Figure 6:
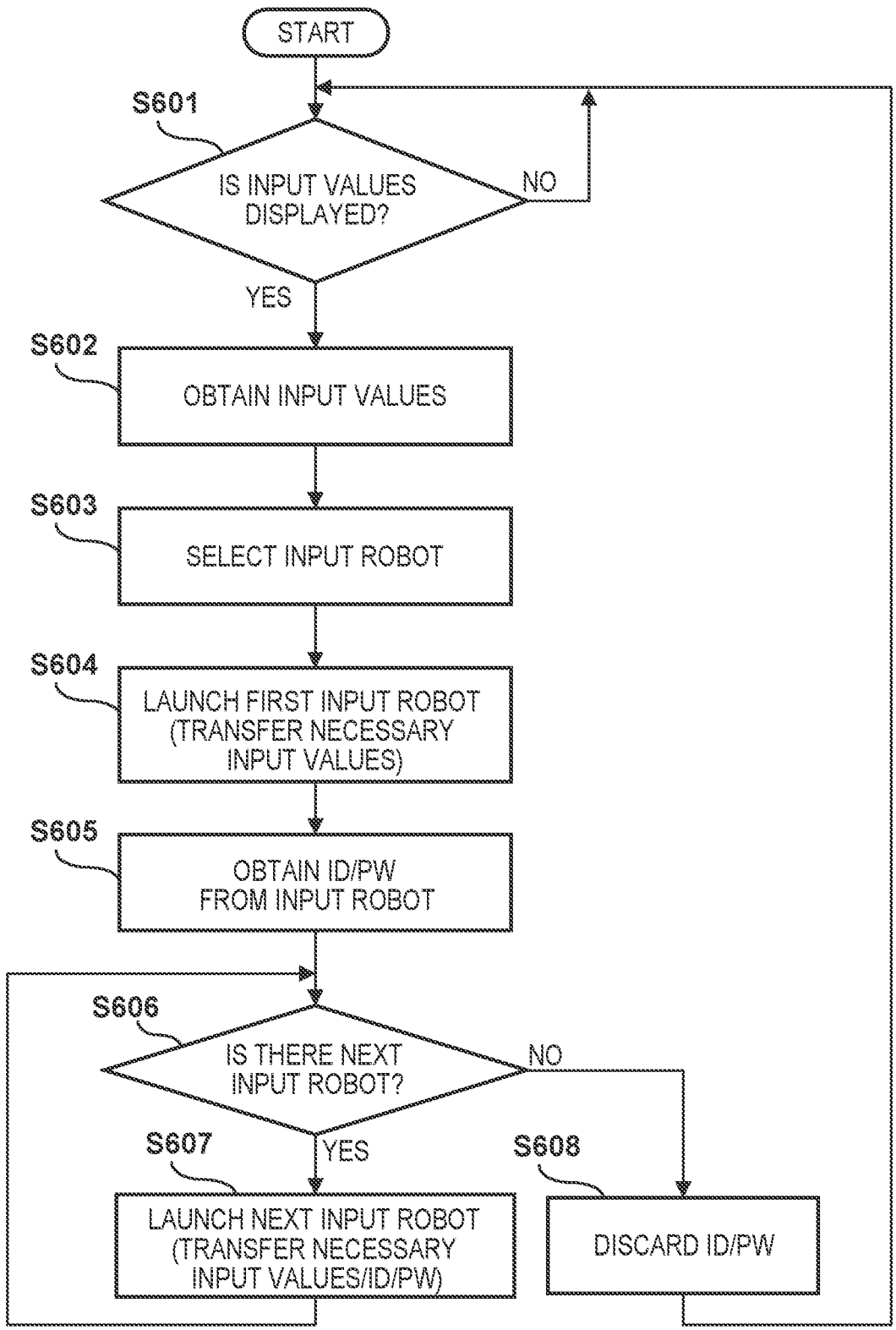
FIG. 6 is a main flowchart of automatic input processing executed by the information processing apparatus 100.

FIG. 6 is a main flowchart of the automatic input processing executed by the information processing apparatus 100. In the example of FIG. 6, the automatic input processing is realized by processes which are executed in parallel with the chat processing and which are different from the chat processing. For example, the control unit 101 may realize processing of each step of FIG. 6 by launching an RPA robot which is configured to execute processing of each step of FIG. 6 and which is different from an input robot.

In step S601, the control unit 101 waits until the input values obtained through the chat processing are displayed on the display unit 104 in the predetermined format (e.g., the HTML table format shown in FIG. 5). Once the input values have been displayed on the display unit 104 in the predetermined format, processing proceeds to step S602.

In step S602, the control unit 101 obtains at least one input value (input value set) displayed in step S601.

In step S603, the control unit 101 selects an input robot based on at least a part of the input value set obtained in step S602. As stated earlier, an input robot is an RPA robot that automates at least a part of an input operation for the input systems.

FIG. 7 is a diagram showing examples of criteria for selecting an input robot. According to the examples of FIG. 7, at least one input robot is selected from among six input robots based on input values corresponding to the application category and whether there is unstamped time. For example, when the application category is 1 (domestic business trip application), an input robot to which ID 1 is allocated, as well as an input robot to which ID 2 is allocated, is selected.

Each input robot is associated with a respective input item set (at least one input item). Also, each input robot is configured to obtain a respective input value set corresponding to the respective input item set, and perform an input operation related to the respective input item set based on the respective input value set on an input screen of an input system. For example, the input robot with ID 1 is associated with an input item set that is requested by the attendance system 151 at the time of domestic business trip application (e.g., the seven input items shown in the table of FIG. 4A). This input robot obtains an input value set corresponding to these seven input items (e.g., the seven input values shown in FIG. 5), and performs an input operation related to the respective input item set based on these seven input values on an input screen of the attendance system 151. Similarly, the input robot with ID 2 is associated with an input item set that is requested by the accounting system 152 at the time of domestic business trip application (e.g., the seven input items shown in the table of FIG. 4A). This input robot obtains an input value set corresponding to these seven input items (e.g., the seven input values shown in FIG. 5), and performs an input operation related to the respective input item set based on these seven input values on an input screen of the accounting system 152.

Note, although the input robot with ID 1 and the robot with ID2 are associated with the same input item set in the foregoing examples, each input robot is associated with a respective input item set as stated earlier. Therefore, the input robot with ID 1 and the robot with ID 2 may be associated with different input item sets. For example, the accounting system 152 may not request input related to the departure time and the return time, and the robot with ID 2 may be associated with five input items other than the departure time and the return time among the seven input items shown in the table of FIG. 4A.

Furthermore, according to the examples of FIG. 7, the input robots corresponding to ID 1 and ID 3 are configured to perform an input operation for the attendance system 151, whereas other input robots are configured to perform an input operation for the accounting system 152. That is to say, each input robot is associated with a respective system. However, the number of input systems accessed by the information processing apparatus 100 may be one, and all input robots may be configured to perform an input operation for the same input system.

Returning to FIG. 6, in step S604, the control unit 101 launches the first input robot (e.g., the input robot corresponding to ID 1) among at least one input robot selected in step S603 (e.g., the input robots corresponding to ID 1 and ID 2). At this time, the control unit 101 provides the input robot with the input value set to be used by the input robot in the input operation as launching parameters for the input robot. For example, when the input robot is associated with the seven input items shown in the table of FIG. 4A, the control unit 101 provides the input robot with the seven input values shown in FIG. 5. The details of processing executed by the launched input robot will be described later with reference to FIG. 8.

In step S605, the control unit 101 obtains, from the input robot launched in step S604, a user ID and a password (user identification information and authentication-purpose knowledge information) for logging into the input system. The details of processing in which the input robot provides the control unit 101 (processes of the automatic input processing) with the user ID and password will be described later with reference to FIG. 8.

In step S606, the control unit 101 determines whether there is a next input robot (an input robot that has not been launched yet). When there is a next input robot, processing proceeds to step S607; otherwise, processing proceeds to step S608.

In step S607, the control unit 101 launches the next input robot. At this time, the control unit 101 provides the input robot with the input value set to be used by the input robot in the input operation as launching parameters for the input robot. In addition, the control unit 101 provides the input robot with the user ID and password obtained in step S605 as launching parameters for the input robot. Thereafter, processing returns to step S606. Remaining input robots are launched in the processing loop of steps S606 and S607.

Note, it is assumed here that it is after the completion of processing of one input robot when the next input robot is launched. However, when the OS and user interfaces of the information processing apparatus 100 are configured to enable simultaneous operations by a plurality of input robots, the control unit 101 can launch the next input robot without waiting for the completion of processing of the input robot that was launched first.

In step S608, the control unit 101 discards the user ID and password obtained in step S605. This can inhibit the fraudulent reuse of the user ID and password by processes that are not intended by the user. Thereafter, processing returns to step S601.

Figure 8:
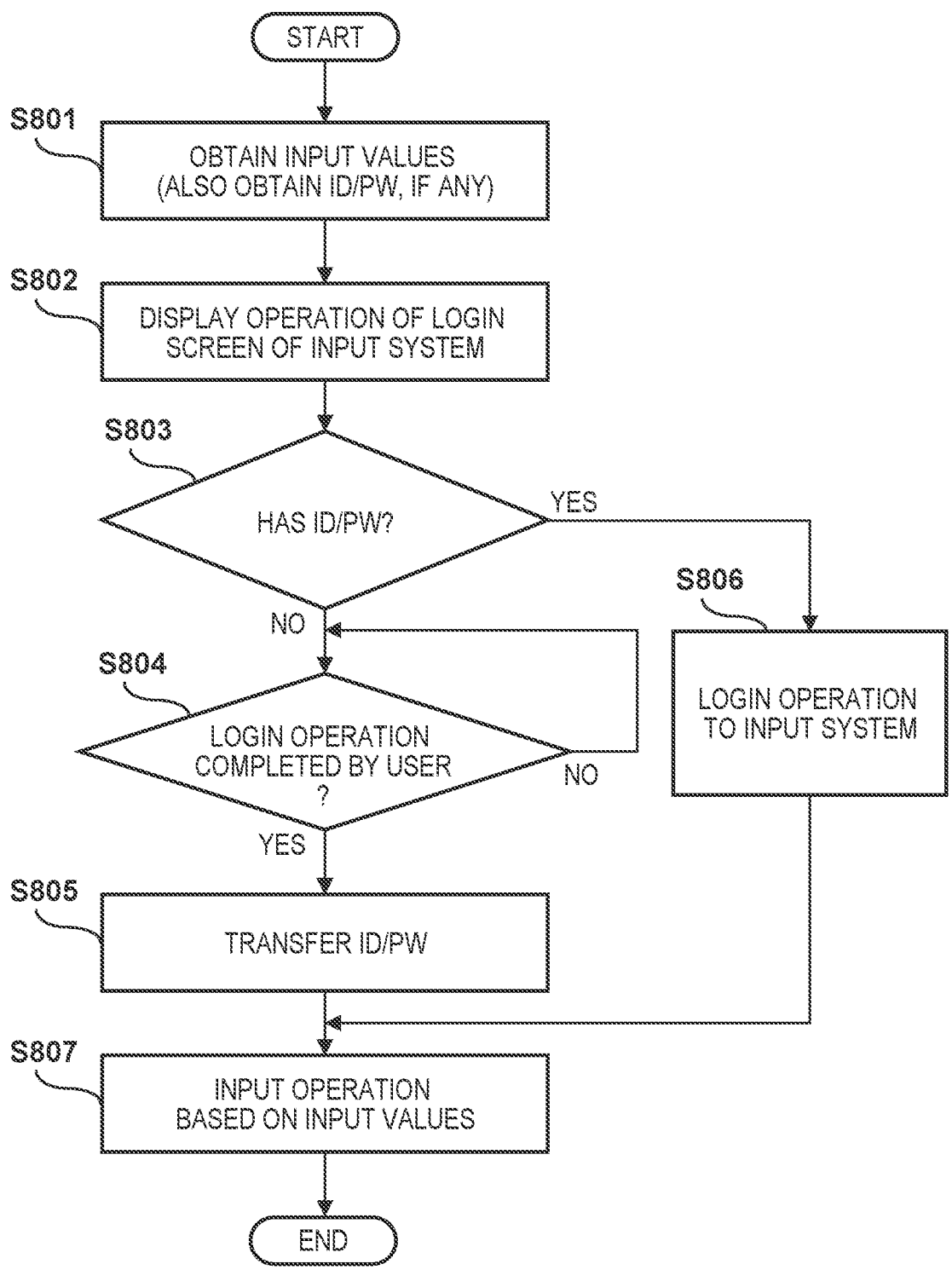
FIG. 8 is a flowchart of input processing executed by an input robot launched in step S604 or S607 of FIG. 6.

FIG. 8 is a flowchart of input processing executed by the input robot launched in step S604 or S607 of FIG. 6. Note, as the input robot is implemented using software (program), processing of each step of FIG. 8 is executed by the input robot under control of the control unit 101.

In step S801, the input robot obtains an input value set to be used in an input operation. Furthermore, when the input robot has been launched in step S607, the input robot also obtains a user ID and a password. As stated earlier, the input value set, user ID, and password can be obtained as, for example, launching parameters for the input robot.

In step S802, the input robot performs an operation of causing a login screen of the input system associated with itself (e.g., the attendance system 151) to be displayed.

In step S803, the input robot determines whether the user ID and password are present (whether the user ID and password were obtained in step S801). When the user ID and password are absent, processing proceeds to step S804; when the user ID and password are present, processing proceeds to step S806.

In step S804, the input robot waits for the completion of a login operation performed by the user. FIG. 9 is a diagram showing an example of the login screen. When the user ID and password were not obtained in step S801, the user needs to perform the login operation by him/herself. The input robot may display a message that prompts the user to perform the login operation, such as a message 901. Once the user has completed the login operation (inputting of the user ID and password, as well as pressing of a login button), processing proceeds to step S805.

In step S805, the input robot provides processes of the automatic input processing of FIG. 6 with the user ID and password that were input by the user in the login operation (see step S605 of FIG. 6).

On the other hand, in step S806, the input robot performs an operation of inputting the user ID and password obtained in step S801 on the login screen (i.e., the user ID and password that were input by the user in the login operation corresponding to the input robot that was launched first). In addition, the input robot may also perform an operation of pressing the login button. Therefore, when each input system is configured to enable a login with use of the shared user ID and password, it is sufficient for the user to input the user ID and password only once even when a login to a plurality of input systems is requested.

In step S807, on an input screen of the input system to which the input robot has logged in (omitted in the drawings), the input robot performs an input operation related to the input item set associated with itself based on the input value set obtained in step S801.

As described above, the control unit 101 selects and launches at least one input robot (see FIG. 6), and each input robot performs processing of FIG. 8, thereby realizing automatic input for the input systems based on the input value set obtained through a chat operation (e.g., the input value set shown in FIG. 5).

Note, it is assumed in the foregoing description that the display of the input values obtained through the chat processing in the predetermined format (e.g., the format shown in FIG. 5) triggers (step S601 of FIG. 6) processes of the automatic input processing to start the obtainment of the input values and the like (step S602 onward). However, the present embodiment is not limited to this configuration. For example, processes of the chat processing may store the input values into a predetermined storage area (a clipboard or a specific file). In this case, the storage of the input values into this storage area in step S601 of FIG. 6 can trigger processes of the automatic input processing to proceed to step S602. In this case, processes of the automatic input processing obtain the input value set from this storage area in step S602.

Furthermore, it is assumed in the foregoing description that processes of the automatic input processing wait for the display of the input values obtained through the chat processing in the predetermined format (e.g., the format shown in FIG. 5) (step S601 of FIG. 6). However, the present embodiment is not limited to this configuration. For example, processes of the chat processing may invoke processes of the automatic input processing at a timing when the obtainment of the input values through the chat processing has been completed.

Summary of Embodiments

The foregoing embodiments disclose at least the following information processing apparatus, control method, and storage medium.

Item 1

An information processing apparatus (100), comprising:

an obtainment unit (101) configured to obtain a first input value set corresponding to a first input item set that includes at least a part of a plurality of input items;

a selection unit (101) configured to select at least one RPA robot from among a plurality of RPA robots that are each associated with a respective input item set based on at least a part of the first input value set, each of the plurality of RPA robots being configured to obtain a respective input value set corresponding to the respective input item set, and perform an input operation related to the respective input item set based on the respective input value set on an input screen of an input system (151, 152);

a launching unit (101) configured to launch the at least one RPA robot; and a control unit (101) configured to perform control so that each of the at least one RPA robot obtains, as the respective input value set, an input value set corresponding to the respective input item set among the first input value set.

According to this embodiment, a processing load on an input operation performed by an RPA robot for the input system can be reduced.

Item 2

The information processing apparatus (100) according to item 1, wherein each of the plurality of RPA robots is configured to be associated with a respective input system (151, 152), and perform the input operation on an input screen of the respective input system (151, 152).

According to this embodiment, an input operation by an RPA robot can be realized in an environment where there are a plurality of input system options on which the input operation is to be performed.

Item 3

The information processing apparatus (100) according to item 2, wherein each of the plurality of RPA robots is configured to perform an operation of causing the input screen of the respective input system (151, 152) to be displayed.

According to this embodiment, as an RPA robot performs an operation of displaying an input screen in addition to an input operation for an input value for an input item, an operation load on a user can be further reduced.

Item 4

The information processing apparatus (100) according to item 1, further comprising a chat unit (101) configured to, via interaction with a user using a chatbot, select at least one input item from among the plurality of input items, and obtain at least one input value corresponding to the at least one input item, wherein the obtainment unit (101) obtains the at least one input value corresponding to the at least one input item as the first input value set corresponding to the first input item set.

According to this embodiment, a user can prepare, through an intuitive operation, an input value set that is used by an RPA robot in an input operation.

Item 5

A control method for an information processing apparatus (100), comprising:

obtaining (S602) a first input value set corresponding to a first input item set that includes at least a part of a plurality of input items;

selecting (S603) at least one RPA robot from among a plurality of RPA robots that are each associated with a respective input item set based on at least a part of the first input value set, each of the plurality of RPA robots being configured to obtain a respective input value set corresponding to the respective input item set, and perform an input operation related to the respective input item set based on the respective input value set on an input screen of an input system (151, 152);

launching (S604, S607) the at least one RPA robot; and performing (S604, S607) control so that each of the at least one RPA robot obtains, as the respective input value set, an input value set corresponding to the respective input item set among the first input value set.

According to this embodiment, a processing load on an input operation performed by an RPA robot for the input system can be reduced.

Item 6

Anon-transitory computer-readable storage medium which stores a program for causing a computer of an information processing apparatus (100) to execute a control method comprising:

obtaining (S602) a first input value set corresponding to a first input item set that includes at least a part of a plurality of input items;

selecting (S603) at least one RPA robot from among a plurality of RPA robots that are each associated with a respective input item set based on at least a part of the first input value set, each of the plurality of RPA robots being configured to obtain a respective input value set corresponding to the respective input item set, and perform an input operation related to the respective input item set based on the respective input value set on an input screen of an input system (151, 152);

launching (S604, S607) the at least one RPA robot; and performing (S604, S607) control so that each of the at least one RPA robot obtains, as the respective input value set, an input value set corresponding to the respective input item set among the first input value set.

According to this embodiment, a processing load on an input operation performed by an RPA robot for the input system can be reduced.

Note that no particular limitation is intended regarding the specific configurations of software and hardware for implementing various types of functions that have been described in the foregoing embodiments. Arbitrary software, arbitrary hardware, and an arbitrary combination of arbitrary software and arbitrary hardware are encompassed within the scope of the foregoing embodiments, as long as they are technically possible.

Although the embodiments of the invention have been described above, the invention is not limited to the foregoing embodiments, and various variations/changes are possible within the spirit of the invention.

What is claimed is:

1. An information processing apparatus, comprising:
   a chat unit configured to, via interaction with a user on a chat screen using a chatbot, select at least one input item from among a plurality of input items, and obtain at least one input value corresponding to the at least one input item;
   an obtainment unit configured to obtain the at least one input value corresponding to the at least one input item as a first input value set corresponding to a first input item set that includes at least a part of the plurality of input items;
   a selection unit configured to select at least one RPA robot from among a plurality of RPA robots that are each associated with a respective input item set based on at least a part of the first input value set, each of the plurality of RPA robots being configured to obtain a respective input value set corresponding to the respective input item set, and perform an input operation related to the respective input item set based on the respective input value set on an input screen, different from the chat screen, of an input system;
   a launching unit configured to launch the at least one RPA robot; and
   a control unit configured to perform control so that each of the at least one RPA robot obtains, as the respective input value set, an input value set corresponding to the respective input item set among the first input value set,
   wherein the interaction with the user using the chatbot is performed before the at least one RPA robot is launched.

2. The information processing apparatus according to claim 1,
   wherein each of the plurality of RPA robots is configured to be associated with a respective input system, and perform the input operation on an input screen, different from the chat screen, of the respective input system.

3. The information processing apparatus according to claim 2,
   wherein each of the plurality of RPA robots is configured to perform an operation of causing the input screen, different from the chat screen, of the respective input system to be displayed.

4. A control method for an information processing apparatus, comprising:
   via interaction with a user on a chat screen using a chatbot, selecting at least one input item from among a plurality of input items, and obtaining at least one input value corresponding to the at least one input item;
   obtaining the at least one input value corresponding to the at least one input item as a first input value set corresponding to a first input item set that includes at least a part of the plurality of input items;
   selecting at least one RPA robot from among a plurality of RPA robots that are each associated with a respective input item set based on at least a part of the first input value set, each of the plurality of RPA robots being configured to obtain a respective input value set corresponding to the respective input item set, and perform an input operation related to the respective input item set based on the respective input value set on an input screen, different from the chat screen, of an input system;

launching the at least one RPA robot; and performing control so that each of the at least one RPA robot obtains, as the respective input value set, an input value set corresponding to the respective input item set among the first input value set, wherein the interaction with the user using the chatbot is performed before the at least one RPA robot is launched.

5. A non-transitory computer-readable storage medium which stores a program for causing a computer of an information processing apparatus to execute a control method comprising:

via interaction with a user on a chat screen using a chatbot, selecting at least one input item from among a plurality of input items, and obtaining at least one input value corresponding to the at least one input item;

obtaining the at least one input value corresponding to the at least one input item as a first input value set corresponding to a first input item set that includes at least a part of the plurality of input items;

selecting at least one RPA robot from among a plurality of RPA robots that are each associated with a respective input item set based on at least a part of the first input value set, each of the plurality of RPA robots being configured to obtain a respective input value set corresponding to the respective input item set, and perform an input operation related to the respective input item set based on the respective input value set on an input screen, different from the chat screen, of an input system;

launching the at least one RPA robot; and performing control so that each of the at least one RPA robot obtains, as the respective input value set, an input value set corresponding to the respective input item set among the first input value set, wherein the interaction with the user using the chatbot is performed before the at least one RPA robot is launched.

* * * * *